United States Patent
Lehner (10) Patent No.: US 8,577,034 B2
(45) Date of Patent: Nov. 5, 2013

(54) METHOD AND DEVICE FOR PROTECTING A READING DEVICE FOR CARD-SHAPED DATA CARRIERS FROM UNAUTHORIZED EVALUATION OR COPYING OF MAGNETICALLY ENCODED DATA OF AN INSERTED CARD-SHAPED DATA CARRIER

(75) Inventor: Christian Lehner, St. Florian (AT)

(73) Assignee: Keba AG, Linz (AT)

( * ) Notice: Subject to any disclaimer, the term of this patent is extended or adjusted under 35 U.S.C. 154(b) by 0 days.

(21) Appl. No.: 12/737,194

(22) PCT Filed: Jun. 17, 2009

(86) PCT No.: PCT/AT2009/000241
§ 371 (c)(1),
(2), (4) Date: Feb. 9, 2011

(87) PCT Pub. No.: WO2010/000004
PCT Pub. Date: Jan. 7, 2010

(65) Prior Publication Data
US 2011/0135092 A1 Jun. 9, 2011

(30) Foreign Application Priority Data
Jun. 18, 2008 (AT) .................. A 970/2008

(51) Int. Cl.
*G06F 21/00* (2013.01)
(52) U.S. Cl.
USPC .......................................... 380/252
(58) Field of Classification Search
USPC ............................................. 380/252, 201
See application file for complete search history.

(56) References Cited

U.S. PATENT DOCUMENTS 5,815,577 A * 9/1998 Clark ............................... 380/52
7,721,963 B2 5/2010 Schliebe et al.
(Continued)

FOREIGN PATENT DOCUMENTS

DE 20 2005 021 134 3/2007
DE 10 2005 043 317 4/2007
(Continued)

OTHER PUBLICATIONS

International Search Report.
Svigals, J., "Unauthorized Card Stripe Reading Inhibitor," IBM Technical Disclosure Bulletin, IBM Corp., New York, US, vol. 26, No. 6, Nov. 1983, p. 2707. XP-002145300 (ISR).

*Primary Examiner* — Brandon Hoffman
*Assistant Examiner* — Anthony Brown
(74) *Attorney, Agent, or Firm* — Collard & Roe, P.C.

(57) ABSTRACT

The invention relates to a method and devices for protecting a reading device (1) for card-shaped data carriers (2) against unauthorized evaluation or copying of magnetically encoded data detected in the reading device (1) for card-shaped data carriers (2). To this end, an electromagnetic noise field (18) is generated by means of a noise field coil (17). The use or disposition of the at least one noise field coil (17) is such that the authorized magnetic field reading head (10) is also affected by the noise field (18) of the noise field coil (17) when the magnetically encoded data of a card-shaped data carrier (2) is being read. An output or sum signal of the authorized magnetic field reading head (10) generated from the wanted signal of a card-shaped data carrier (2) and from the effects of the noise field (18) is detected. The effect of the noise field (18) of the noise field coil (17) in the output or sum signal of the authorized magnetic field reading head (10) is then compensated or filtered out or the wanted signal is selectively filtered out of the output or sum signal of the authorized magnetic field reading head (10).

27 Claims, 6 Drawing Sheets

(56) References Cited

U.S. PATENT DOCUMENTS

| | | | |
|---|---|---|---|
| 8,103,881 B2 * | 1/2012 | Doughty et al. | 713/186 |
| 2007/0131768 A1 | 6/2007 | Wakabayashi | |
| 2007/0293142 A1 * | 12/2007 | Dehmas et al. | 455/1 |
| 2009/0050699 A1 | 2/2009 | Basar et al. | |

FOREIGN PATENT DOCUMENTS

| | | |
|---|---|---|
| EP | 1 067 474 | 1/2001 |
| EP | 1 798 662 | 6/2007 |
| JP | 2001-067524 | 3/2001 |
| WO | WO 2007/048649 | 5/2007 |

* cited by examiner

METHOD AND DEVICE FOR PROTECTING A READING DEVICE FOR CARD-SHAPED DATA CARRIERS FROM UNAUTHORIZED EVALUATION OR COPYING OF MAGNETICALLY ENCODED DATA OF AN INSERTED CARD-SHAPED DATA CARRIER

CROSS REFERENCE TO RELATED APPLICATIONS

This application is the National Stage of PCT/AT2009/00041 filed on Jun. 17, 2009 which claims priority under 35 U.S.C. §119 of Austrian Application No. A 970/2008 filed on Jun. 18, 2008, the disclosure of which is incorporated by reference. The international application under PCT article 21(2) was not published in English.

The invention relates to methods and devices for preventing unauthorized and unnoticed evaluation or copying of information stored on card-shaped magnetic data carriers.

Particularly in connection with cash cards, situations repeatedly arise where cash dispensers or similar service machines which are equipped with reading devices suitable for such cash cards are manipulated by unauthorized third parties with malicious intent so that when these machines are used as intended by a user in good faith, the data recorded on the magnetic stripe of the card-shaped data carrier is read unnoticed with a view to criminal intent. To this end, an additional reading head is unobtrusively fitted on the opening into which the magnetic card is introduced, which then detects the data stored on the card unnoticed when it is introduced. This data is then stored and misused subsequently to make a copy of the card containing identical data. In the situation where a PIN code is needed, it is usually filmed or observed as it is entered on a user terminal. This information is then used by criminals in conjunction with a copy of the card for fraudulent purposes.

In the case of reading devices used in cash dispensers, therefore, structural features have been used in the region of the card reader opening in some cases, in particular devices fitted in front of the card-reader slot, or complex and expensive monitoring systems have been installed with a view to making it more difficult to fit additional reading devices. These features are satisfactory but only under certain conditions.

A system is also known from document DE 20 2005 021 134 U-1, whereby a magnetic noise field is generated in the region of the introduction orifice of a card reader so that detection of the card data via a reading head illegally fitted in this region is disrupted. As a result, the data cannot be read, recorded and reproduced to enable an identical or usable clone of the original card to be made. In the case of this known system, a magnetic coil is mounted in the region of the card reader opening, which is fed by an appropriate frequency generator so that a magnetic noise field is generated in the region of the card reader opening and disrupts the operation of a reading head fitted with a view to manipulation. The main disadvantage of this known system is that the magnetic noise field of the coil not only disrupts a reading head fitted in front of the card reader opening with criminal intent, it also interferes with the reading head of the actual card reader. In practice, this problem is currently being dealt with by opting for card readers of a relatively deeper design in which the reading head in the interior of the card reader is spaced that much farther back from the card reader opening. Furthermore, the noise field is switched off as soon as an inserted card has disappeared completely in the card reader and is therefore outside the detection range of a reading head positioned outside the card reader that has been fitted for criminal purposes. However, it is only possible to use these features with a limited number of card readers of a sufficiently deep design, especially in the case of card readers where the card disappears completely in the reader opening before the magnetic stripe of the card reaches the internal or legitimate reading head. Particularly in the case of card readers of a shorter design used by preference for access systems in which the internal legitimate reading head is disposed relatively close to the card reader opening, such deterrents are not possible. Especially in the case of PDQ readers or swipe readers, these precautionary features are usually totally futile.

The objective of this invention is to propose methods and devices by means of which the unauthorized detection of magnetically encoded data on card-shaped data carriers in the region of reading devices can be reliably prevented for these data carriers, offering a high degree of security against attempts at manipulation.

Independently of the above, another objective of this invention is to propose a system whereby the effect of the noise field can be filtered out of the output or sum signal of an intercepting illegal reading head by simple means.

Related to the above objectives, another independent objective of the invention is to propose features whereby fraudulent tampering in the vicinity of the reading device can be reliably detected.

The first of the above-mentioned objectives of the invention is achieved by one aspect of the invention.

The advantage of this approach is that a reading device operated or working on the basis of this method offers increased security against fraudulent tampering. Specifically, amongst other things, the noise field no longer has to be deactivated as the magnetic data carrier passes through the internal or authorized magnetic field reading head of the reading device. In particular, the noise field can remain activated, even during the phase of reading information or data contained on the data carrier, because the effect of the noise field can be compensated at any time using signal technology. It is therefore possible to use an electromagnetic noise field with reading devices of a relatively short design. In particular, the data of the data carrier can already be read whilst a portion of the card-shaped data carrier is still projecting out from the reading device and a fraudulently fitted reading head is still accessible under certain circumstances. This means that the deterrents proposed by the invention can also be used without any problem in conjunction with reading devices with a short, automated transport distance for the card-shaped data carrier and also with what are referred to as PDQ readers or swipe readers where the data carrier is introduced manually or by a relative movement. An illegally fitted reading head is therefore subjected to the noise field at every relevant instant without the possibility of compensation based on signals for this illegally fitted reading head, thereby reliably preventing any unauthorized detection, evaluation or copying of relevant useful data.

The advantage of the feature of an embodiment is that the suppressed wanted signal which is derived from the magnetic field of the card-shaped data carrier, is restored by computing or digital signal processing, thereby resulting in a particularly rapid and reliable or accurate reconstruction of the wanted signal. The essential aspect is that using the model based on signals, the effect of the noise field can be computed for any and every characteristic of the noise field and for random and virtually random characteristics of the noise control signal supplied to the noise field coil. By contrast with the system of using a periodic noise signal as is the case in the prior art, using a virtually random noise control signal means that it is no longer possible to reconstruct the undisturbed signal elements solely from the signal of the illegally fitted reading head, i.e. the suppressed wanted signal elements. Fraudulent tampering and attempts at detection for this purpose will therefore no longer enable data or information to be obtained from the relevant card.

The features of another embodiment 3 ensure that the effect of the magnetic noise field can also be detected in the output signal of the authorized magnetic field reading head, which means that both the presence in principle as well as any changes to the noise field can be detected.

Based on another advantageous embodiment, a stochastic, i.e. a random noise control signal or noise field with a random time sequence is used. Whilst it is possible to filter out the effect of a periodic noise signal on the signal of an illegally fitted reading head relatively easily, thereby enabling the non-distorted signal information to be reconstructed, this is no longer possible if using a quasi-random noise control signal.

As a result of the features of another emboidment, a noise control signal which has good stochastic properties is generated in a practical manner. This means that even in the event of a long-term recording of the signal delivered by an illegally fitted, intercepting reading head created by additive superimposition of the noise field and the useful data of the magnetic stripe, it is no longer possible to obtain processable signals or information or data which could otherwise be misused to clone the card.

The features of another embodiment also enable the use of stochastic noise control signals or noise fields and these noise effects based on an absence of rules can be compensated again exclusively by the integral signal processing inside the reading device. What is available to quasi external or illegal magnetic field reading heads, on the other hand, is a mixed form derived from the noise field and the magnetic field of the data carrier and it is not possible to split or separate the respective signal elements without having a knowledge of the characteristic of the stochastic noise control signal.

The advantage of the features of further embodiments is that it can be calculated in advance, as it were, what an emitted noise control signal will look like or how it will have been changed after having been transmitted across the transmission distance and picked up again. As a result, it is possible to generate any signal shapes, transmit them across the transmission distance and then compute the noise signal elements or noise effects of the noise control signal and reconstruct a wanted signal corresponding to that which would otherwise have been detected without the effect of a noise field. In particular, this means that the signal distortions in the output or sum signal of the internal or legal magnetic field reading head can also be totally eliminated if complex, and in particular stochastic, noise control signals are transmitted.

As a result of the feature of another embodiment, it is also possible to set up particularly complex transmission characteristics. The essential aspect of this is that the model filter can be adapted so exactly to the real transmission behavior, and virtually the identical signal is obtained at its output as at the output of the authorized magnetic field reading head, and a corresponding sequence of scanning values appears at the output of an AD converter connected downstream if no card-shaped data carrier is being read, in other words only the noise field is acting on the authorized magnetic field reading head. On the basis of simple subtractions, therefore, the noise signal can be removed from a total or sum signal of the magnetic field reading head and the remaining signal processed further as a reconstructed wanted signal.

Due to the features of another embodiment, there is no risk at any time that the useful signals or data of the data carrier can be detected on an unauthorized basis. In particular, there is no time window in which it would be possible to obtain a quasi-pure signal from the data carrier with the magnetically encoded data. Security against fraud and tampering is improved to a high degree as a result.

The advantage of the features of another embodiment is that fraudulent manipulation or also time-dependent or age-related defects can be detected on an automated basis. One advantage of this solution, amongst other things, is that if magnetically and/or electrically conductive parts are fitted, removed or tampered with in the range of the noise field coil, the magnetic field lines and transmission behavior of the noise field coil are changed on the internal magnetic field reading head of the reading device. At the same time however, and above all, a variable is available with a signal-based model to enable the original state to be compared with the desired state. This means that the previously emitted signal-based model will no longer match the real or actual transmission conditions which occur if magnetically active parts have been illegally fitted or modified within the range of the reading device or its noise field coil, or are removed from within this range. With effect from a specific quantity, this variance may be evaluated as an indication that there has been fraudulent tampering and the reading device or some other peripheral unit, in particular a cash dispensing machine fitted with it, can be immediately taken out of service and an alarm triggered if necessary. The same applies in the case of a simple technical defect which changes the effect or behavior of the transmission link. This might be the case in the event of a change to the characteristic of the noise field coil or the internal, authorized magnetic field reading head, for example. A technical defect of the magnetic field reading head of the reading device can also be automatically detected and reported as a result of these features.

The advantage of the features of another embodiment is that the digital filter can continue to be adapted at a fast adaptation speed, even after an initial calibration routine or after an initial setup. This means that the filter coefficients of the signal-based model can also be automatically adapted to a slowly changing transmission behavior. Even without attempts at tampering, slight or creeping changes can occur in the transmission behavior during normal operation. These might be caused by temperature-induced or age-related changes to component variables, for example. Continuous adaptation of the model filter ensures that even in the event of slight changes to the transmission behavior, the effect of the noise field on the magnetic field reading head of the reading device can always be optimally compensated and the noise field cannot cause any impairment to reading quality. It is also of particular advantage to use a stochastic test signal for adapting the model filter, which effectively covers the requirements involved in preventing unauthorized detection attempts.

The advantage of the features of another embodiment is that reconstruction of the wanted signal based on the signal of an illegally fitted magnetic field reading head is made even more difficult. In particular, this additional signal component also makes it more difficult to distinguish or single out the wanted signal originating from the data carrier on the basis of signal processing. Unauthorized detection attempts where processing of the detected signal relies on detecting specific, typical signal shapes are therefore reliably prevented.

The objective of the invention is also achieved by means of a device according to another aspect of the invention.

The advantages and effects which can be achieved with this device essentially mirror the advantages and effects specified in connection with the features used for the method according to the invention. In particular, the effect of the noise field coil on the magnetic field reading head of the card reader can be compensated at any time as a result and the actual wanted signal originating from an inserted card-shaped data carrier can therefore be reliably extracted. This enables the noise magnetic field to be continuously maintained and allows the use of more complex noise control signals whilst offering a more compact design of the reading device. The particularly high security with regard to fraud and tampering in the case of a reading device equipped in this manner can also be easily achieved on existing reading devices. In particular, existing devices can be retro-fitted and updated relatively free of problems. In addition, the internal, authorized noise field compensation operates particularly reliably and can also be used for complex and data-intensive signals without any extra delay or processing times.

Another embodiment ensures that without a knowledge of the characteristic of the noise control signal, it is no longer possible to extract the actual wanted signal. The random noise control signal therefore makes it more difficult to detect any useful information which can be processed and thus thwarts fraudulent interception. This can be made even more difficult by opting for a multiple array, in particular a double array, of noise field coils, each with linearly independent noise control signals.

The advantage of another embodiment is that, by restricting or concentrating the bandwidth of the noise control signal to or within the range typical for the wanted signal, the total power of the noise control signal can be reduced as a ratio of its power or effect in the frequency range of the wanted signal. Conversely, this means that whilst maintaining a constant or specific output power of the noise field, a stronger effect can be obtained in the spectral range of the wanted signal. The amplifier stages as well as the noise field coil can therefore be rated for a lower power which, as a rule, means that a compact design and energy-saving operation can be obtained.

The advantage of the design of another embodiment is that the essential parts of the signal processing take place in digital format. In particular, the noise signal computed by means of the signal processor and reproduced on the basis of the model can simply be subtracted from the output or sum signal of the magnetic field reading head and the remaining wanted signal can either be converted back into an analogue signal by a DA converter and made available for continued processing or the wanted signals is already evaluated by software in the signal processor. This guarantees an inexpensive overall solution and the noise field generator proposed by the invention is integrated in the control and evaluation electronics of the card reader.

As a result of another embodiment, the effect of the noise field can be calculated sufficiently accurately in advance. This may be easily implemented using software and converted by means of a signal processor. A digital filter of this type is characterized by a set of filter coefficients by means of which the exact frequency and phase response of the filters can be set. Also of advantage is the fact that a signal-based model of this type can be easily and rapidly adapted to changing conditions or to legitimately changing circumstances or situations by simple reprogramming or recalibration and, if necessary, can even be so during ongoing operation.

The advantage of another embodiment is that the filter coefficients, preferably determined as part of a calibration routine, can be stored on a non-volatile basis in a memory, so that when the noise field generator or reading device is switched on again, there is no need for another calibration routine.

The advantage of another embodiment is that a set of reference coefficients is available, which describes the transmission behavior of the legitimate, non-manipulated state of the reading device. The filter coefficients of the model filter can be adapted at least once as part of a calibration routine so that the transmission behavior of the signal-based model corresponds to that of the real signal path across the noise field coil.

The advantage of the features of another embodiment is that the stored model parameters are used as comparison values for evaluating the presence of tampering or defects of the reading device. In this case, therefore, it is not the remaining noise signal which can no longer be fully compensated that is used as an indication of tampering or a defect but the variance of the continuously or periodically calibrated model parameters compared with the originally determined and stored parameters which is used as an indication of tampering or a defect. For example, this enables automatic detection of fraudulent tampering in the vicinity of the reading position for a card-shaped data carrier, in particular in the region of the slot through which a card-shaped data carrier is inserted. Criminal attempts to get round the system in the form of electromagnetic screening or shifting of the noise field coil, these features being intended to reduce or eliminate the effect of the noise field coil on the illegally fitted reading head, can be automatically detected. A defect or a deliberate action to switch off the function of the noise field coil is automatically detected as a result.

Another embodiment results to a certain extent in a multi-channel noise field, thereby further reducing the possibilities of reconstructing the wanted signal corresponding to the card data from the signal of an illegally fitted reading head. In particular, the security preventing tampering with such a reading device is improved.

As a result of another embodiment, sufficiently small manufacturing tolerances will result in very constant transmission behavior and readily reproducible noise field effects. Consequently, the signal-based model provided as a means of compensating the effect of the noise field is of a standard design suitable for all and many types of reading devices. In many cases, this obviates the need for an initial adaptation or the setting of model parameters based on examples.

Another embodiment results in a reading device which offers a particularly high degree of security against manipulation and tampering.

An advantageous embodiment automatically prevents a rightful owner or user from inserting a card-shaped data carrier if non-typical situations or situations indicating tampering occur. This specifically prevents any relative movement between a card-shaped data carrier and an illegally fitted reading head.

Finally, another embodiment is of advantage because automated teller machines such as cash dispensers or automated transfer machines, or access control systems are proposed which offer a high degree of security against tampering and fraud.

Also of advantage are the additional features of another embodiment because the data on the magnetic stripe to be protected is at no point inserted in the reading device or placed in the transmission path to the higher-ranking electronic unit so that it could be or read or accessed by illegally fitted electronic circuits or changes made to the original hardware or software.

The features of another embodiment are also of advantage because comprehensive protection can be obtained against fraud and tampering using relatively simple hardware. In particular, the data of the magnetic stripe is encrypted in the same unit as that in which the noise field is compensated. This is a relatively smaller range which is well protected from the outset and which cannot be accessed other than with a lot of effort and only with very specialized technical know-how.

The invention will be explained in more detail below with reference to examples of embodiments illustrated in the appended drawings. These are highly simplified, schematic diagrams illustrating the following.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Figure 1:
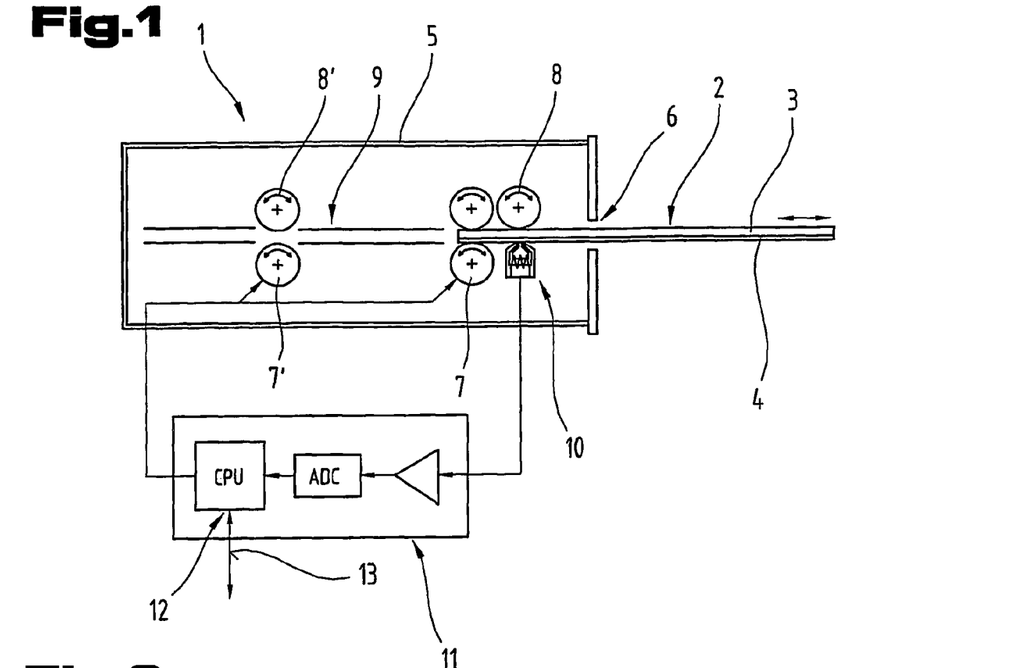
FIG. 1 illustrates an example of a reading device of the type based on a reader which draws in card-shaped data carriers, corresponding to the system known from the prior art.

FIG. 1 illustrates a conventional reading device 1 for card-shaped data carriers 2, on which information or data is at least magnetically stored. In particular, this reading device 1 is designed to process magnetic cards 3 with at least a magnetic stripe 4 and/or chip cards with at least a magnetic stripe 4. In a manner known per se, data relevant to usage and security is stored on this magnetic stripe 4, which can be automatically read and/or edited or updated by the reading device 1. Such card-shaped magnetic data carriers 2 might be bank cards or cash cards in particular, as well as authorization cards used for authentication purposes in connection with access or usage authorization for specific facilities. In other words, the specified reading device 1 is often used in bank or other service-related automated machines or access control systems.

Such reading devices 1 usually comprise the following components: a housing 5, at least one insertion orifice 6 or card reader opening in which magnetic data carrier 2 is inserted and then subsequently removed, usually at least one motor driven conveyor roller 7, 7' for automatically drawing in and pushing out an inserted data carrier 2, optionally counter-pressure rollers 8, 8' and/or guide elements 9, at least one magnetic field reading head 10 for detecting by sensing magnetically encoded information stored on the data carrier 2 and an evaluation and control circuit 11 for controlling the relevant functions of the reading device 1 needed for the reading operation and for decoding the signals delivered by the magnetic field reading head 10 and/or by an array of spring elements for contacting the chip and/or by a contact-less reading unit or RFID module. The evaluation and control circuit 11 is usually also used to convert the detected signals into corresponding digital information and to forward this information via an appropriate signal and data interface 12. The data interface might be an interface permitting a two-way exchange of data, such as a serial interface (RS 232, RS 485), an Ethernet or USB-interface. The signal and data interface 12 may also comprise nothing more than one or more status or signal wires 13 across which specific statuses can be signaled. Such a status and signal wire 13 might be used to unlock an access door when an inserted data carrier 2 is recognized as being valid and authorized, for example.

The diagram of FIG. 1 illustrates a magnetic card reader, in which a co-operating magnetic card 3 with a magnetic stripe 4 has been partially inserted. The evaluation and control circuit 11 is illustrated outside the housing 5 of the reading device 1 to provide greater clarity. However, the evaluation and control circuit 11 is usually integrated in the housing 5 of the reading device 1 together with the mechanical and electrical components.

With a view to retaining greater clarity, other generally standard mechanical, electrical and electromechanical components of a card reader which are not necessarily crucial to the invention have been omitted from the drawing, for example a flap or shutter on the card reader opening which can be electro-mechanically locked, spring-biased pressing and guide elements, a voltage supply, sensors for detecting and defining the position of an inserted data carrier 2, memory elements for storing and retrieving data and programmes by a processor unit (CPU, DSP), as well as various signal-based links. These elements are also well known from the prior art and can be readily inferred and implemented by the person skilled in the art.

Figure 2:
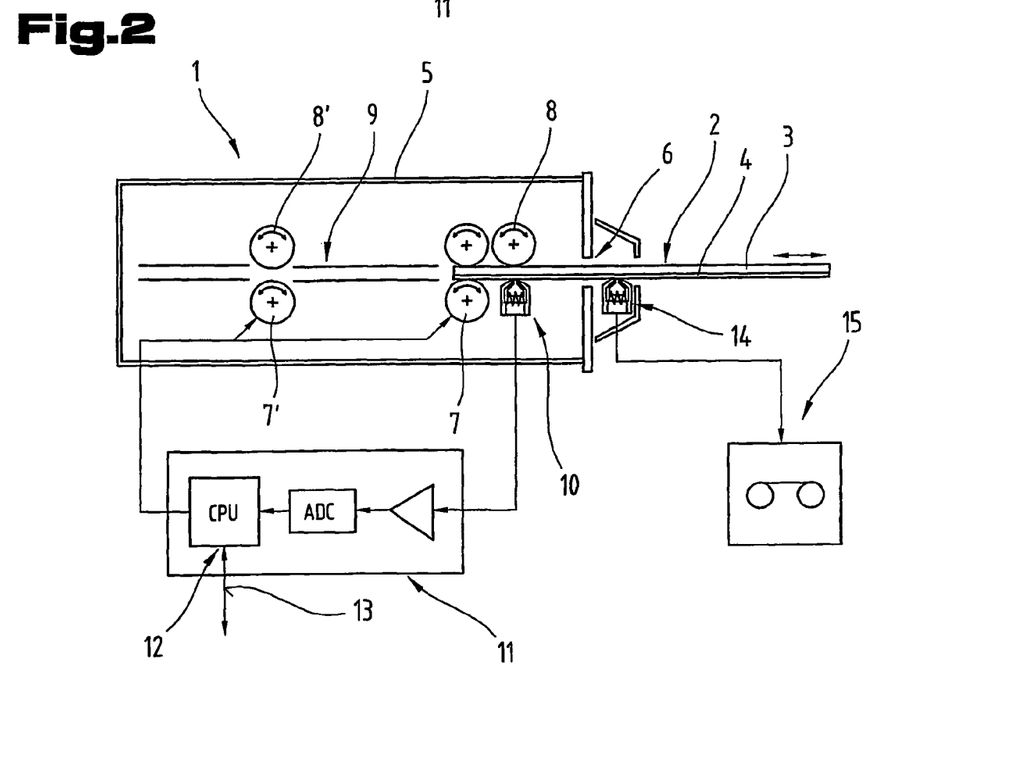
FIG. 2 shows the card reader illustrated in FIG. 1 in a state in which it has been tampered with for fraudulent purposes, a well-meaning user of the reading device usually being unaware of such tampering.

FIG. 2 illustrates a reading device 1, in particular a conventional magnetic card reader of the type illustrated in FIG. 1, on which another magnetic field reading head 14 has subsequently been fitted in front of the actual card reader opening or in front of the insertion orifice 6 for a card-shaped data carrier 2 by a criminal for fraudulent purposes so that when a magnetic card 3 is inserted, the information or data contained on it can be intercepted and used subsequently to make an illegal copy of a magnetic card containing the same data. Due to what is usually a very compact and inconspicuous design, the additional, magnetic reading head is not usually perceptible as being such and the card information can be unlawfully detected without the authorized cardholder realizing it.

The signal of the additionally fitted, illegal magnetic field reading head 14 can then be fraudulently recorded—in a manner known per se—by the criminal on hidden recording apparatus 15 and analyzed at a later point in time. As a result, the data obtained in this manner can be misused to make an unauthorized copy of the card.

Figure 3:
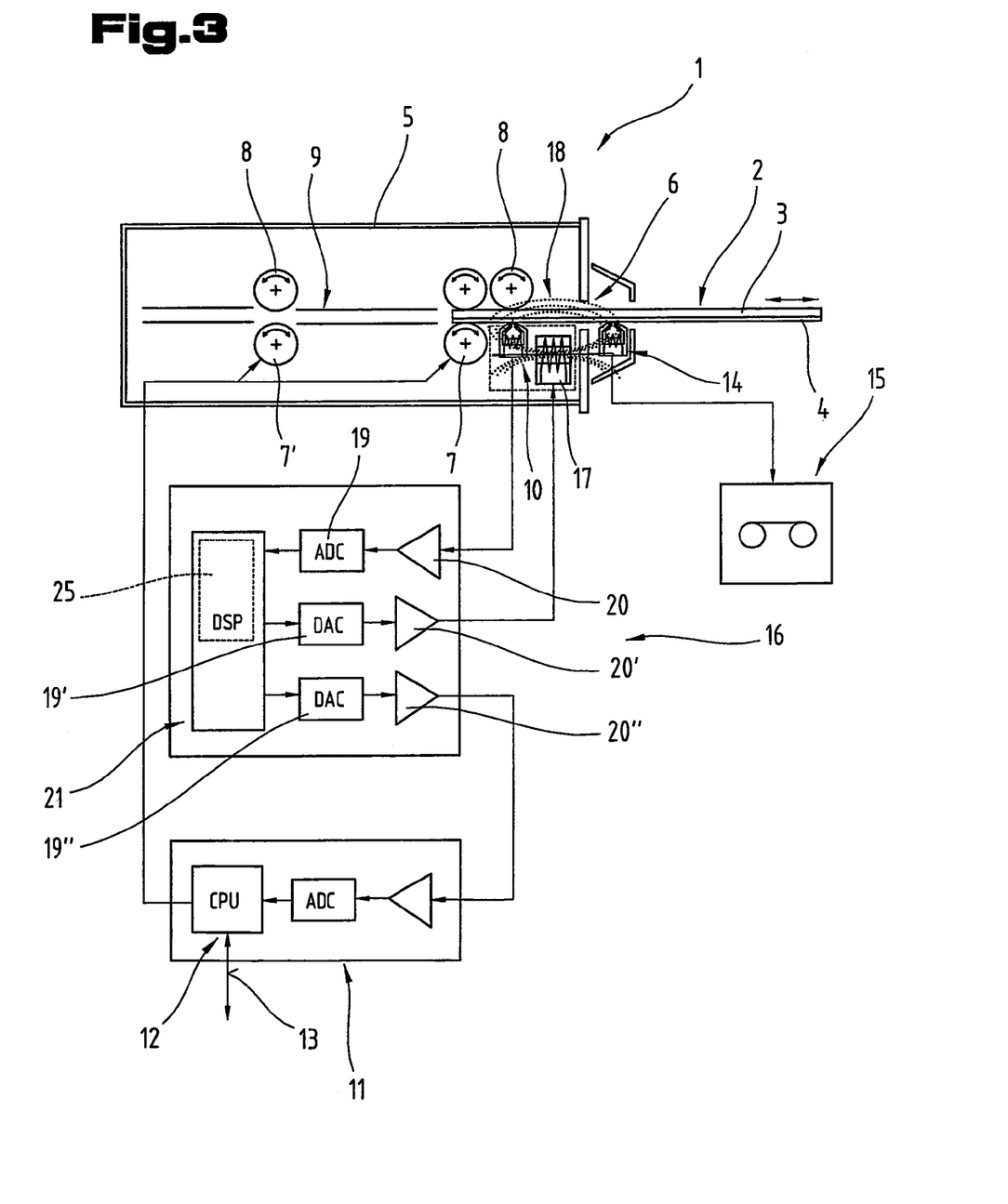
FIG. 3 illustrates a reading device protected against tampering as proposed by the invention, on which an additional reading head of the type illustrated in FIG. 2 has been fitted for fraudulent purposes.

FIG. 3 illustrates a reading device 1 proposed by the invention, in particular a magnetic card reader with an anti-tampering system proposed by the invention or a noise field generator 16 proposed by the invention. At least one magnetically active noise field coil 17 is mounted on the internal face of the card reader opening or insertion orifice 6, to which a preferably stochastic noise control signal is applied. The preferably stochastic electric noise control signal on the noise field coil 17 generates a magnetic noise field 18, which acts on a magnetic field reading head 14 which might have been fitted in front of the card reader opening for fraudulent purposes and induces a noise signal in it which is additively superimposed on the signal generated by a magnetic card 3 as it is moved past. Due to this superimposition of the wanted signal on the stochastic noise control signal of the noise field generator 16 or on the noise field 18 of the noise field coil 17 supplied by it, detection of the actual card data is thwarted and unauthorized reproduction of the card data prevented. Furthermore, the noise field 18 acts in a similar way to the actual magnetic field reading head 10 of the reading device 1 in terms of operation. In particular, the noise field 18 of the noise field coil 17 may be sufficiently intense or the noise field coil 17 and the legal or legitimate magnetic field reading head 10 may be positioned so close to one another that the noise field 18 also has a significant effect on the magnetic field reading head 10 and its signal behavior or reading results.

The noise field coil 17 illustrated in FIG. 3 is shown inside the card reader opening or inside the housing 5. However, the noise field coil 17 may also be mounted in front of the card reader opening in principle, in other words outside of the actual card reader. The noise field coil 17 may also be designed as an add-on module which can be retro-fitted.

An equally practical and advantageous embodiment indicated by broken lines is one based on a structural combination of the magnetic field reading head 10 and the noise field coil 17. In other words, it is also possible to provide a magnetic field reading head 10 with an integrated noise field coil 17. Such a combination or integration based on low manufacturing tolerances offers very constant and readily reproducible transmission behavior with respect to the effect of the noise field, and the signal-based model 25 described in more detail below as a means of compensating for the effect of the noise field may be made to a standard design for all types of machine. In particular, negligible variances or scatter can be obtained between the individual types or units of the magnetic field reading head 10 and noise field coil 17. Accordingly, this obviates the need for adaptation or the setting of model parameters based on examples or at the least this can be reduced to a very simple setup. Alternatively, such an arrangement is also especially well-suited to use with a simple analogue circuit for compensating the effect of the noise field on the sum or output signal of the magnetic field reading head 10.

The essential factor is that the position of the noise field coil 17 and/or a rating of the radiation power, in particular the field intensity, or the radiation characteristic, in particular the field characteristic of the noise field coil 17 and/or a rating of the detection sensitivity of the authorized respective legitimate magnetic field reading head 10 can be selected so that the noise field 18 of the noise field coil 17 affects a magnetic field reading head 14 fitted for fraudulent purposes, at least whilst the magnetically encoded data of the data carrier 2 is being read, and also acts on the legitimate respective authorized magnetic field reading head 10 and influences its output or sum signal.

The noise field generator 16 is illustrated as a separate component in this instance, which may advantageously be designed as an optional add-on or expansion module which can be retrofitted on a standard, already existing evaluation and control circuit 11 for a reading device 1. In the case of new designs of reading devices 1 above all, the noise field generator 16 may naturally also be an integral part of the control electronics, in particular of the evaluation and control circuit 11.

Signal processing of the noise field generator 16 is based on a digital scanning system with AD/DA converters 19-19" at the transitions to the analogue signals. In order to adapt the respective level of the analogue signals to the inputs and outputs of the AD/DA converters 19-19', amplifiers or adaptor stages 20-20" are provided, which usually also incorporate simple low-pass filters (anti-alias filters) and such like. The circuit of the noise field generator 16 also has a digital computer unit, preferably a digital signal processor unit 21 (DSP), which is wired to the magnetic field reading head 10 of the reading device 1, to the noise field coil 17 of the reading device 1 and to the evaluation and control circuit 11 of the reading device 1. Alternatively, the evaluation electronics may be at least partially provided by the signal processor unit 21, as will be described in more detail below.

The noise field generator 16 supplies the noise field coil 17 with a stochastic noise control signal, as a result of which the stochastic noise field 18 is generated. The electric output or sum signal of the magnetic field reading head 10 of the reading device 1, which is likewise affected by the magnetic noise field 18, is then no longer sent directly to the evaluation electronics, i.e. is no longer sent directly to the evaluation and control circuit 11 of the reading device 1 and instead, is initially forwarded to the digital signal processor unit 21 (DSP) of the noise field generator 16, which computes out or filters out all the signal elements correlated with the noise control signal. The signal corrected or suppressed by the digital signal processor unit 21, i.e. the wanted signal, is then forwarded to the evaluation and control circuit 11 and evaluated in the conventional manner. Alternatively, it would also be possible for the suppressed signal, i.e. the wanted signal, to be evaluated by the digital signal processor unit 21 (DSP) and the latter is then used for controlling the sequences of the reading device 1 or the peripheral units as well, as will be explained below.

The connection of the reading device 1 to a primary device controller, e.g. to the controller of an automated cash dispenser, is illustrated in the drawings on a simplified basis in the form of a general signal and data interface 12 for communicating with and transmitting information from the magnetic card 3. In order to retain clarity in the drawings, the data sink is not illustrated.

The noise field generator 16 may also have various control inputs and control outputs. For example, the noise field generator 16 may have input and output interfaces for controlling activation and deactivation of the noise field 18, for triggering an initial calibration during which the coefficients of the signal transmission model and signal behavior are stored, for triggering a reset of the hardware and/or for signaling an unacceptably high variance between the stored signal model (desired state) and the actual transmission conditions (actual state) which occur. The latter interface of the noise field generator 16 is therefore able to provide an indication of any unauthorized manipulation of the reading device 1.

The functions of the described inputs and outputs may also be handled by a more complex communication interface, which is provided as a means of communicating with a primary controller computer. A more complex interface might be a serial RS232 or RS485 interface, an Ethernet interface or a USB-interface, for example.

Figure 4:
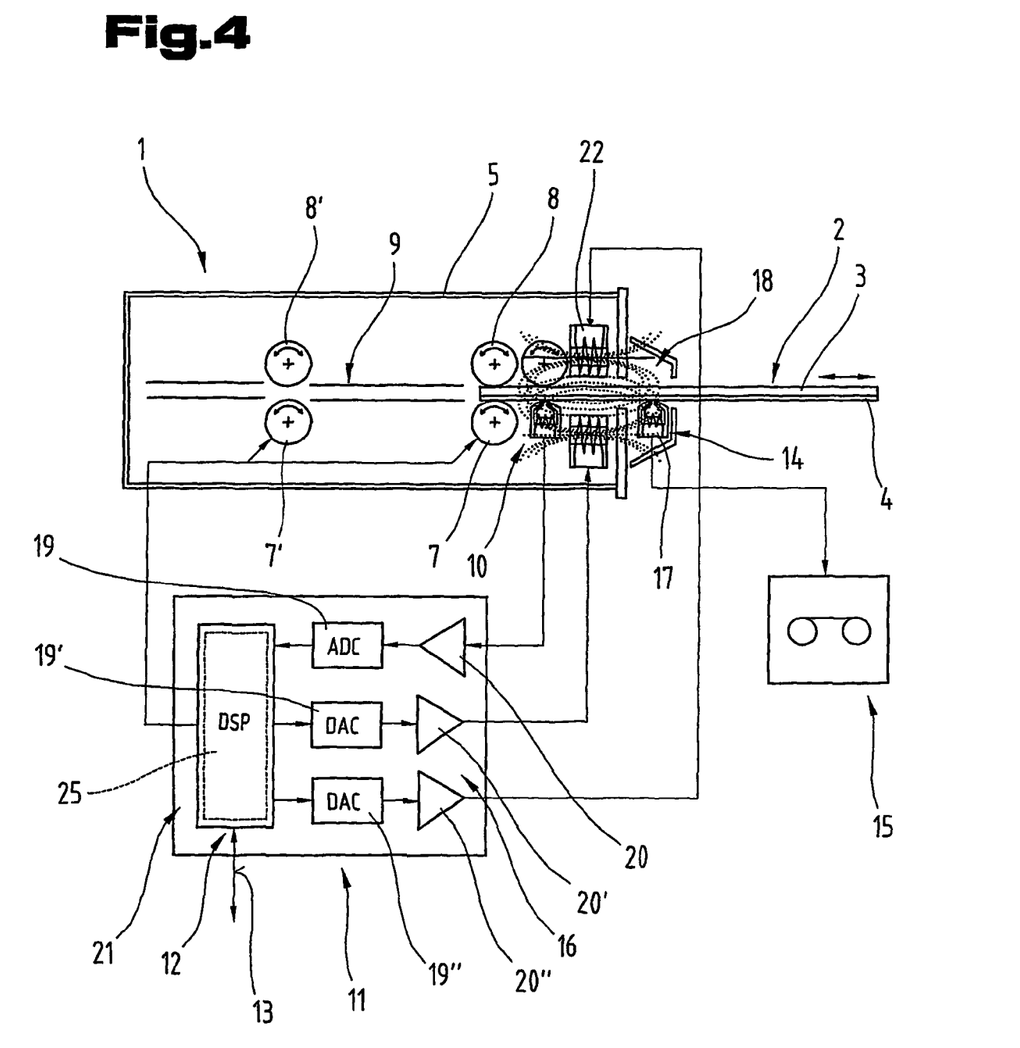
FIG. 4 shows an embodiment of the design illustrated in FIG. 3 comprising more than one noise field coil.

FIG. 4 illustrates an advantageous embodiment of the noise field generator 16 proposed by the invention, by means of which at least a second noise field coil 22 is provided in addition to the first field coil 17, to which a second noise control signal not correlated with the first noise control signal is applied. This improves security against manipulation of the reading device 1 still further.

In this instance, the noise field generator 16 is an integral component of the central evaluation and control circuit 11 of the reading device 1. The output or sum signal of the legitimate or authorized magnetic field reading head 10 is suppressed in the digital signal processor unit 21 (DSP), i.e. the elements correlated with the two noise signals are computed out. The signal suppressed in this manner, i.e. the reconstructed wanted signal of the magnetic field reading head 10, is then directly decoded in an adequate manner by the digital signal processor unit 21 (DSP) and the extracted data is forwarded to a primary device controller, in particular via the signal and data interface 12. In this instance, the digital signal processor unit 21 (DSP) also assumes control of the drive or conveyor rollers 7, 7' of the reading device 1 and activation of other components which might be provided, although these are not illustrated, such as a controllable closure screen for the card reader opening, or the evaluation of various sensors used to detect the position of an inserted magnetic card 3.

Figure 5:
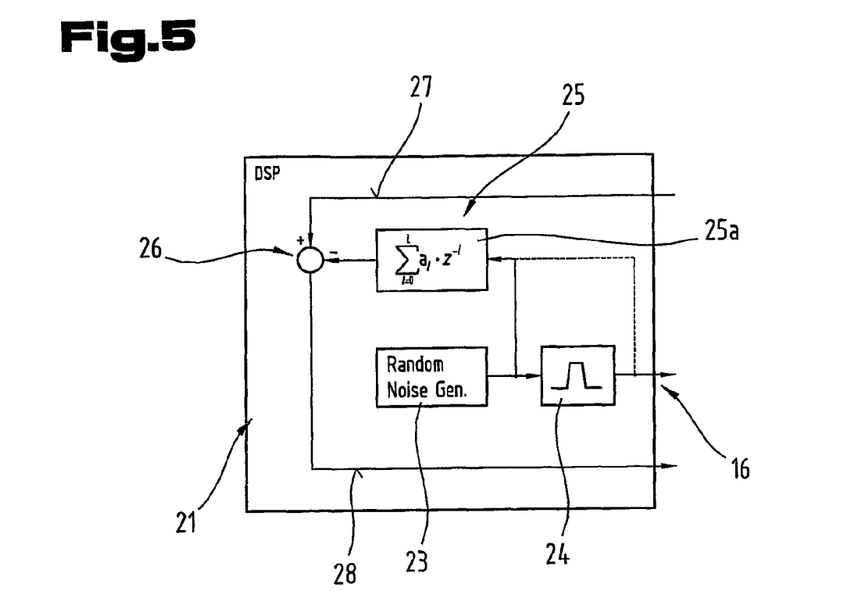
FIG. 5 is a block diagram of the signal processing unit, such as may be used to implement the invention.

FIG. 5 is a block diagram illustrating the digital signal processing which takes place in the digital signal processor unit 21 for a relatively simple form of the noise field generator 16, for example for implementing the invention based on a reading device 1 of the type illustrated in FIG. 3.

The output point for generating the stochastic noise control signal is a digital pseudo-random number generator 23. This generator generates at least pseudo-type random numbers. The sequence of random numbers generated by the pseudo-random number generator 23 corresponds at least approximately to a white noise with a largely uniform spectral power density in the entire discrete frequency range of the digital scanning system.

The white noise sequence of the pseudo-random number generator 23 is preferably limited by means of a digital band pass filter 24 to a frequency band which usually contains at least a part of those frequencies which occur in the wanted signal of the magnetic field reading head 10 when the magnetic card 3 is being read—FIG. 3. The power and bandwidth of the noise control signal are concentrated on those frequencies which are essential to distorting the signal in the foreign or illegal magnetic field reading head 14—FIG. 3—and which can also be eliminated by means of simple band pass filtering without also removing the elements of the wanted signal. The output sequence limited by bandwidth is forwarded to a DA convertor, not illustrated, where it is converted into an analogue noise control signal for activating the noise field coil 17—FIG. 3.

The same random number sequence of the pseudo-random number generator 23 or—as indicated by broken lines—the output signal of the band pass filter 24 is also forwarded to a signal-based model 25, in particular a digital model filter 25a. The digital model filter 25a illustrated in this instance is an FIR filter of the standard type. Details of the design, operation and properties of such FIR filters may be found in the relevant background literature. The coefficients of the model filter 25a are selected so that the entire signal transmission behavior of the real route from the pseudo-random number generator 23 via the band pass filter 24, noise field coil 17 and magnetic field reading head 10 is imitated in terms of signals. The coefficients of the model filter 25a describe the signal transmission behavior of the entire trans-mission route between the pseudo-random number generator 23 and fictitious summation point 26 disposed between the signal of the magnetic field coil 10—FIG. 3—and the output signal of the digital model filter 25a. The coefficients of the model filter 25a preferably characterize the entire signal transmission behavior within the route between the pseudo-random number generator 23, band pass filter 24 and the elements of the DA convertor 19' illustrated in FIG. 3 by way of example, amplifier and adaptation stage 20', noise field coil 17, magnetic field reading head 10, amplifier and adaptation stage 20 and the AD convertor 19 back to the summation point 26. As explained above, other components which determine or affect signal transmission behavior may also be provided within this signal transmission route between the pseudo-random number generator 23 and a return path 27 running from the magnetic field reading head 10—FIG. 3—to the summation point 26. The other influencing factors within this signal transmission route are best provided by the filter coefficients and the model filter 25a. The essential factor is that the filter coefficients form a signal-based model 25 which imitates the actual signal transmission behavior across the signal transmission route described above sufficiently accurately. In the case of this simple basic form of noise field generator 16, the filter coefficients are set up on a one-off and fixed basis, in particular a factory setup. The filter coefficients can be determined at the factory as soon as the complete reading device 1 has been assembled and can be initiated by means of a calibration routine, for example.

At the summation point 26, the computed sequence of the noise field influence is subtracted from the real output or sum signal of the magnetic field reading head 10 or from its digitized sequence of scanning values. The real signal of the magnetic field reading head 10—FIG. 3—is then directed via the symbolic return path 27 to the model-type summation point 26. At the summation point 26, the distorted element in the output or sum signal is eliminated from the magnetic field reading head 10 and a non-distorted or suppressed wanted signal is reconstructed for ongoing processing. This suppressed wanted signal is then applied to a summation path 28 of the summation point 26.

The sequences and connections described above should be understood as being based on a model. They are implementation by the software-controlled, programmable signal processor unit 21 (DSP). In particular, the signal-based model 25 described above is run by means of the signal processor unit 21 (DSP).

Figure 6:
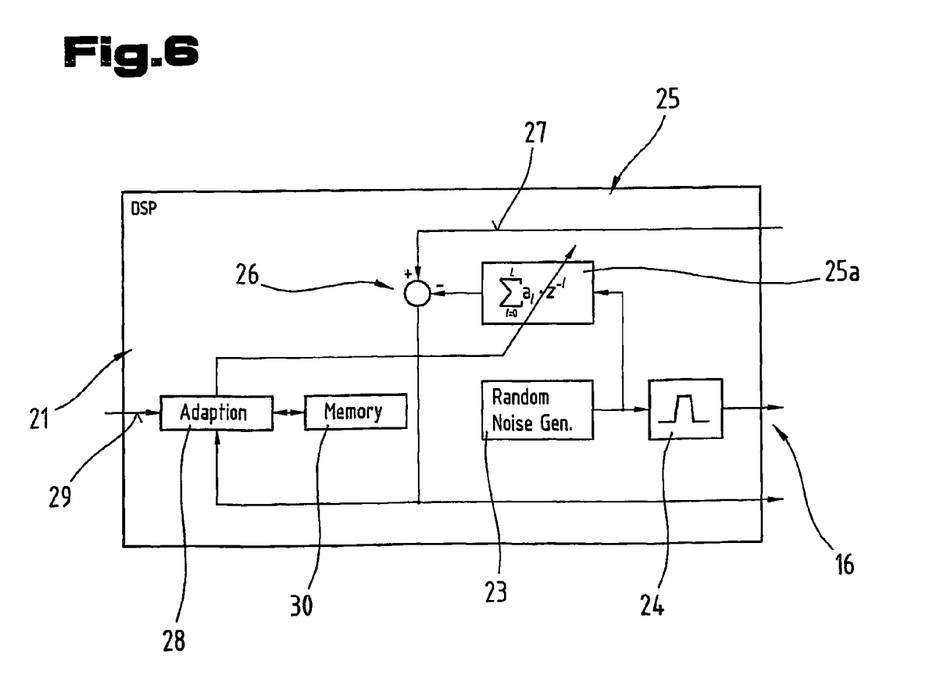
FIG. 6 is an extended signal processing unit incorporating an adaptive, signal-based model.

FIG. 6 illustrates a more complex variant of the signal processing of the noise field generator 16 by means of which, by contrast with the basic variant illustrated in FIG. 5, the model filter 25a can be adapted to the real transmission behavior subsequently or constantly and/or adaptation can be activated as and when necessary. A programme module containing an appropriate adaptation algorithm 28 is therefore run in the signal processor software. A known adaptation algorithm 28 is the so-called LMS algorithm (Least Mean Square)—for more details, see the background literature by Widrow Stearns. The adaptation may take place both in time and using the Fast Fourier Transformation (FFT) in the frequency range.

The fact that the filter coefficients of the model filter 25a are constantly adapted by means of the adaptation algorithm 28 enables a higher quality to be obtained in terms of reconstructing the non-distorted signal sequence because even small changes which occur in the real trans-mission behavior, such as temperature-induced fluctuations or changes due to ageing, can be comprehensively compensated. Another advantage of constant adaptation is the possibility of being able to compare the filter parameters for the current transmission behavior with a previously stored reference status which means that variances due to tampering can be detected. Such variances caused by tampering can then be signaled to an authorized point or to the user of the reading device 1, and the digital signal processor unit 21 can initiate or generate alarm- and/or error messages, for example. Alternatively or in combination with this, the anti-tampering system incorporating the noise field generator 16 may cause the reading device 1 to be locked or placed out of service or may place the entire automated machine equipped with the reading device 1 out of service.

To enable manipulative actions on the reading device 1 to be reliably detected, it may be of advantage if, instead of the band pass filter 24, a filter is used to optimize the power of the noise control signal which also has a specific minimum power density outside the actual noise frequency band (shaping filter) but which may be below that of the actual noise control signal. This improves the possibility of being able to detect changes in the transmission behavior of the real route and meets the digital requirements for constant adaptation of the model filter 25a.

By using an appropriate control command system or a control line 29, a calibration routine can be initiated if necessary, i.e. as a function of the process and/or controlled by the user, by means of which the digital filter coefficients of the model filter 25a can be adapted to the transmission behavior of the real route and can then be stored in a non-volatile memory 30. The stored parameters are used both for initializing the model filter 25a after switching on the supply voltage and as a reference with respect to a non-distorted or non-manipulated state of the reading device 1. However, initiation of a calibration or adaptation routine for the model filter 25a may also be controlled on a timed basis. The essential aspect is that as a result of this adaptive model filter 25a, the signal-based model 25 can be adapted so that long-term or creeping or even small changes in the signal transmission behavior which are not attributable to tampering or defects can be taken into account as effectively as possible during the preferably computerized compensation of the noise field effect.

Figure 7:
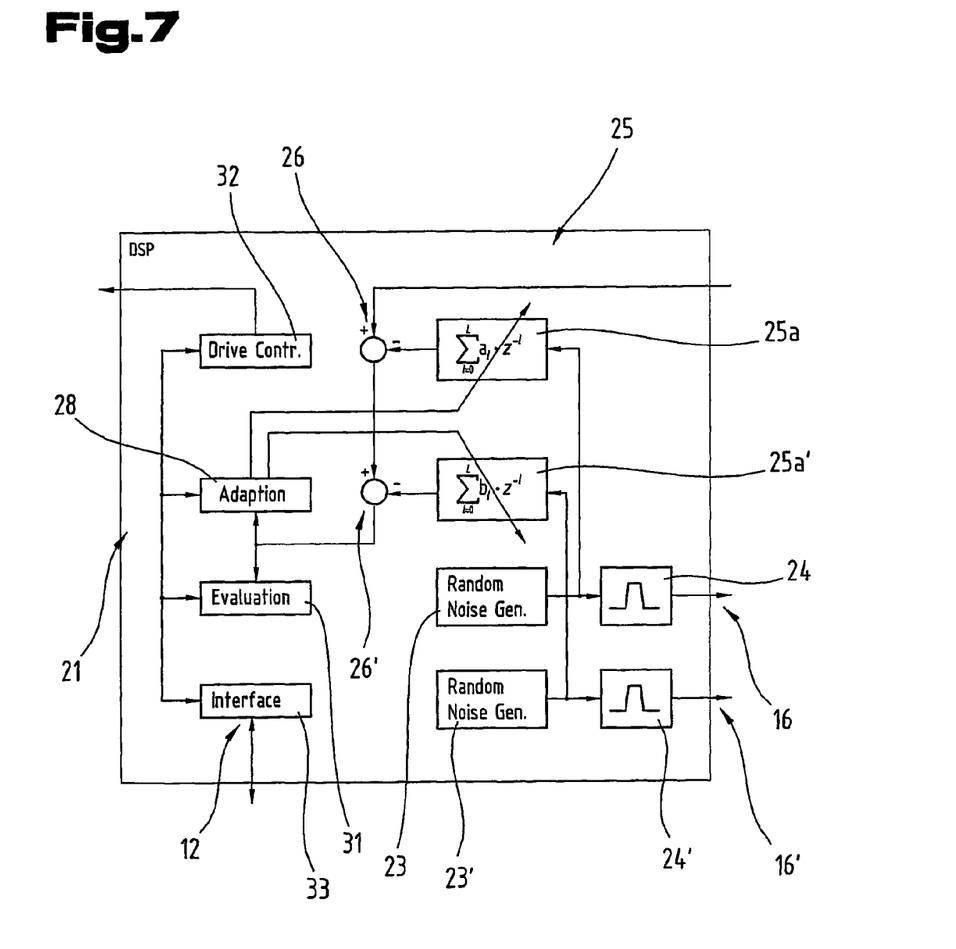
FIG. 7 illustrates an embodiment of the signal processing unit incorporating a multiple array of adaptive, signal-based models and additional, integral evaluating units as well as control and communication interfaces.

FIG. 7 illustrates an even more sophisticated variant of the signal processing of the noise field generator 16 and the signal-based model 25, in particular for a reading device 1 of the type illustrated in FIG. 4. By contrast with the variant illustrated in FIG. 6, two non-correlated noise signal sequences are generated as a means of activating two noise field coils 17, 22—FIG. 4. This results in a two-channel noise field, as it were. A separate model filter 25a, 25a' is provided for each of the two noise channels, which model the effect of the respective noise signal on den magnetic field reading head 10 of the reading device 1. As in FIG. 6, the model filters 25a, 25a' may be based on an adaptive design and thus adapt on a long-term basis to changing transmission conditions. The functional elements or components of the digital signal processor unit 21 that are respectively duplicated or used more than once are denoted by the relevant reference number prefixed with an additional apostrophe.

As also illustrated in FIG. 7, the wanted signal from the legitimate magnetic field reading head 10 of the reading device 1 is decoded by the digital signal processor unit 21. To this end, the signal processor unit 21 runs an evaluation unit 31 operated by software. As illustrated by the block diagram shown in FIG. 7, the drive for the device conveying the card inside the reading device 1—FIG. 4—is also activated by the signal processor unit 21, in particular by a drive controller 32 operated by it. Furthermore, at least the magnetically stored card data, in particular at least the relevant or requisite parts of this data, are forwarded via a co-operating interface 33 to a primary device controller.

Advantageous features of the method and operating modes of the invention will be described below with reference to the embodiments illustrated in FIGS. 3-7. Parts that are the same in the different embodiments are denoted by the same reference numbers in these drawings illustrating the method and configuration of the invention.

As with the embodiments described above as examples, a noise field generator 16 is provided, which co-operates with and is coupled with a signal-based model 25. By means of this signal-based model 25, the signal transmission behavior from the noise field coil 17 to the internal magnetic field reading head 10 of the reading device 1 is copied and described. Taking account of the signal-based model 25, the effect of the noise field 18 on the output signal of the magnetic field reading head 10 and the characteristic of the noise field 18 is calculated. In particular, the output or sum signal of the magnetic field reading head 10 made up of the wanted signal from the card-shaped data carrier 2 and the noise control signal or noise field 18 is corrected by subtracting the calculated effect of the noise field. The effect of the noise field 18 on the magnetic field reading head 10 is therefore completely or almost completely compensated. After subtracting the calculated effect of the noise field, the remaining signal or wanted signal contains only those elements that were generated due to the magnetic stripe 4 of a magnetic card 3 being moved past the magnetic field reading head 10. In other words, the calculated signal corresponds to a wanted signal as it would have been detected without the effect of the additional noise field 18.

The signal-based model 25 for calculating the effect of the noise field in advance is preferably implemented in the form of the digital model filter 25a respectively 25a', which may be provided in the form of an FIR filter in particular. The digital model filter 25a respectively 25a' is expediently run by software and implemented by means of the signal processor unit 21. Such a model filter 25a, 25a' has a set of filter coefficients, by means of which the frequency and phase response of the filter can be set sufficiently accurately. The FIR (finite impulse response) filter is therefore preferably a digitally operated filter. In principle, however, a suitable signal-based model 25 could also be set up on the basis of analogue technology and used for the purposes of the invention. In other words, the main parts of the described signal processing could also be run using analogue technology.

The specified features offer a whole range of major improvements and these features constitute a starting point for various advantageous embodiments. First of all, the noise field 18 does not have to be deactivated whilst the magnetic card 3 is passing through the internal or authorized magnetic field reading head 10 of the reading device 1 because the effect of the noise field 18 is compensated by signals at every instant and the non-distorted wanted signal originating from the data of the magnetic stripe 4 can be reconstructed by computer. The magnetic noise field 18 can therefore also be used with reading devices 1 of a relatively short design—by reference to the direction in which the magnetic card 3 is inserted. In other words, the described noise field generator 16 can also be used with reading devices 1 in which the card data is already being read whilst a part of the magnetic card 3 is still protruding out from the reading device 1 and is thus still accessible to a magnetic field reading head 14 fitted for fraudulent purposes or interception. The noise field generator 16 can therefore also be used with reading devices 1 of a short design and remain constantly activated and may remain active whilst the magnetically encoded data of the magnetic card 3 is being read. The fraudulently fitted magnetic field reading head 14 is therefore subjected to the noise field 18 at every relevant instant without there being any possibility of the signal-based compensation of the distorted part getting into the output signal of the magnetic field reading head 14 fitted with criminal intent.

By means of the signal-based model 25, the effect of the noise field can be calculated for every active characteristic of the noise field 18 and for every characteristic of the noise control signal supplied to the noise field coil 17. By contrast with the system known from the prior art where a noise field generator which generates a periodic noise signal is used, the system proposed by the invention also enables a stochastic, i.e. random, noise control signal or noise field 18 to be used. Whereas the effect of a periodic noise signal on the illegally fitted magnetic field reading head 14 can be subsequently filtered out relatively easily and the intact signal information reconstructed, using a quasi-random noise control signal means that it is no longer possible to reconstruct the intact signal elements or wanted signal elements from the signal of the additional or fraudulently fitted magnetic field reading head 14.

Another decisive advantage of the solution proposed by the invention using the signal-based model 25 resides in the fact that the magnetic field lines and hence the transmission behavior of the noise field coil 17 at the magnetic field reading head 10 of the reading device 1 is changed by the manipulative fitting, removal or altering of magnetically and/or electrically conductive parts within the influencing range of the noise field coil 17. At the same time, however, a comparison variable for the original or desired state is available with the signal-based model 25. This means that electrically or magnetically conductive parts fitted in the region of the card reader opening for fraudulent purposes or modified or removed from this region and which were previously adapted to the signal-based model 25 no longer match the transmission conditions actually occurring. If a magnetic card 3 is not being read or a magnetic card 3 is not being inserted, the signal of the magnetic field reading head 10 must be practically zero in the non-manipulated state once the effect of the noise field has been compensated. If, on the other hand, the card reader opening has been tampered with in the manner described above, the changed, actual effect of the noise field can no longer be completely compensated by means of the signal-based model 25 and at least a certain amount of the effect of the noise field is present even after compensation or filtering out. With effect from a certain degree, this remaining amount of influence can be evaluated as an indication that tampering has taken place and the reading device 1 or the automated machine equipped with it can then be placed out of service and/or an alarm triggered. In view of the fact that the signal-based model 25 is used, it is also no longer possible to eliminate the effect of the noise field coil 17 without being detected, for example by applying magnetic screening or by destroying the noise field coil 17, for example by boring through the front plate of the reading device 1, nor is it possible to weaken or eliminate the effect of the noise field coil 17 by inserting tools through the slot of the reading device 1 to move the noise field coil 17. Each of these acts of tampering causes a variance in the real transmission behavior from the signal-based model 25 so that system critical or fraudulent manipulations can be automatically detected. The same also applies in the case of a simple defect, which eliminates or changes the effect of the noise field coil 17. Even a defect caused by wear and tear due to age or signs of wear on the magnetic field reading head 10 of the reading device 1 can therefore be automatically detected and reported by incorporating the signal-based model 25 in the reading device 1.

As an alternative to using the output signal of the magnetic field reading head 10 as a means of monitoring the function and state of the noise field 18, it would also be possible to use the signal from a sensor coil, although this is not illustrated, which is provided solely for the purpose of monitoring the noise field 18 and does not otherwise detect any other wanted signal. Detection of the non-manipulated original state and then any subsequent manipulation will then take place in exactly the same way as with the output or sum signal of the magnetic field reading head 10, but without detecting and re-processing a reconstructed wanted signal.

The explanations and descriptions given in this document relate primarily to reading devices 1 based on the type involving insertion in the reader, i.e. reading devices 1 with a motorized drive for automatically drawing in and conveying an inserted magnetic card 3. However, the invention is equally suitable for other different designs of magnetic card readers currently in use, such as manual swipe readers or readers where the card is simply inserted.

Advantageous features, embodiments and variants of the invention will be described below. Amongst others, it is of advantage to implement the described features using the signal processor unit 21. Using such a signal processor unit 21, a broadband, stochastic, in particular pseudo-random noise control signal can be computed, amongst other things. The noise control signal constitutes colored noise and a filtered and hence spectrally limited noise is generated by a band pass filter 24, which is firstly generated by means of the pseudo-random number generator 23 illustrated in FIG. 5 and then filtered by a band pass filter 24 as illustrated in the diagrams of FIG. 3 and output via the DA convertor 19' and amplifier and adaptation stage 20' in order to activate the noise field coil 17. The output or sum signal of the magnetic field reading head 10 suppressed by the noise control signal or affected by the noise field 18 is also forwarded via the amplifier and adaptation stage 20 to the AD convertor 19 and then applied to the processor core or signal processor of the signal processor unit 21. In the signal processor unit 21, the signal-based model 25—FIG. 5, 6, 7—for the route described above is reproduced in the form of a digital model filter 25a, for example in the manner of an FIR filter. The model filter 25a delivers at its output the same or virtually the same signal sequence as that of the AD convertor 19—FIG. 3—due to the output signal of the magnetic field reading head 10 if no magnetic card 3 is being read and the noise field 18 is merely acting on the magnetic field reading head 10. The computed noise signal is also subtracted from the output or sum signal of the magnetic field reading head 10 in the signal processor unit 21 and the remaining or resultant signal is either converted by via a DA convertor 19"—FIG. 3—back into an analogue signal and passed through the original evaluation and control circuit 11 for decoding the card data (FIG. 3) or this decoding takes place in the signal processor unit 21 already with the aid of appropriate algorithms and a software module (FIG. 4). The essential aspect is that the effect of the noise field 18 of the noise field coil 17 on the output or sum signal of the magnetic field reading head 10 is compensated or filtered out or the wanted signal is selectively filtered out of the output or sum signal of the authorized magnetic field reading head 10. Evaluation or subsequent processing of the wanted signal may be run in the reading device 1 or in peripheral electronic units.

To this end, the noise field generator 16 contains the signal-based model 25, which is configured to imitate the effect of the noise field 18 on the output or sum signal of the authorized magnetic field reading head 10. This model-based imitation is used to compensate the effect of the noise field 18 on the output or sum signal of the authorized magnetic field reading head 10 and hence reconstruct a wanted signal from the output or sum signal of the authorized magnetic field reading head 10 depending on the inserted card-shaped data carrier 2.

It is of advantage if the sampling rate and the processing rate of the discrete scanning system or signal processing unit described above are more than twice as high as the highest frequency elements of the wanted signal in the signal of the magnetic field reading head 10 when a magnetic data carrier 2 is being read. This ensures that the information contained in the wanted signal is fully and unambiguously detected.

It is of advantage if the model filter 25a is based on an adaptive design and algorithms or software modules are run in the signal processor unit 21, by means of which the filter coefficients of the model filter 25a are automatically adapted at least once in a calibration routine so that the transmission behavior corresponds to the way in which the signal-based model 25 affects the transmission behavior of the real signal path across the noise field coil 17. The filter coefficients determined during the calibration routine are preferably stored in a non-volatile memory 30—FIG. 6—so that there is no need for another calibration routine when the noise field generator 16 is switched on again. The fact that the filter coefficients are stored in memory means that a set of reference coefficients is available which describe the transmission behavior of the original and non-manipulated state of the reading device 1. Various algorithms and methods, some of which have been known from the prior art for many years, may be used to determine the appropriate filter coefficients such as the Least Mean Square algorithm (LMS algorithm).

The model filter 25a is adapted to an individual device, which means that there is no need to use a signal-based model 25 that is fixed and always remains the same for all types of device or all reading devices 1. The fact that the effect of the signal-based model 25 is adapted to an individual device in this manner advantageously means that problems are avoided or at least significantly reduced during operation of the reading device 1, in particular due to component or manufacturing tolerances as well as varying effects attributable to different installation situations.

It is also of advantage if, after an initial calibration routine, the digital model filter 25a is also adapted at a slow adaptation speed, i.e. the filter coefficients of the signal-based model 25 are adapted to a slowly changing transmission behavior. Even without tampering, slight changes can occur in transmission behavior, for example due to temperature-induced or age-related changes of component variables. Running a continuous adaptation of the model filter 25a ensures that the effect of the noise field on the magnetic field reading head 10 of the reading device 1 is optimally compensated even in the event of slight changes in transmission behavior. In spite of the continuous or periodic adaptation, it is of advantage to provide an initial calibration routine whereby the model parameters for the transmission behavior in the original state of the device are determined and stored on a non-volatile basis. These stored model parameters are used on the one hand as power-on start-up values for the signal-based model 25 so that the noise field compensation also operates sufficiently effectively immediately after switching the reading device 1 on. On the other hand, the stored model parameters can be used as comparison values for evaluating the presence of tampering or defects of the reading device 1. This being the case, it is preferable if it is not the remaining, no longer fully compensatable noise signal that is used as a characteristic for tampering or a defect but rather the variance of the continuously calibrated model parameters from the originally determined and stored model parameters.

Based on one advantageous embodiment, the output signal of the authorized magnetic field reading head 10, corrected as regards the effect of the noise field, is constantly monitored during those phases when no magnetic data carrier 2 is being inserted in the reading device 1 to ascertain whether a specific total or spectral power is being exceeded. If this is the case, an appropriate status or error message is made available to a primary device controller because this is an indication of tampering.

Based on another advantageous embodiment, the broadband stochastic noise control signal is limited by means of a digital filter, in particular by means of a band pass filter 24, to a bandwidth which contains at least a part of the bandwidth of the wanted signal as a result of the data recorded on the magnetic card 3 and a specific adjoining frequency range. Limiting the bandwidth to the range typical for the wanted signal reduces the total power of the noise control signal necessary or to be applied as a ratio of its intensity and effect in the frequency range of the wanted signal and, conversely, a stronger effect can be achieved in the spectral range of the wanted signal with the same output power so that the proportion of the active noise control signal compared with the proportion of the wanted signal can be increased. The dimensioning of the amplifier and adaptation stage 20'—FIG. 3—and the dimensioning of the noise field coil 17 can, conversely, be selected for a lower total power, which usually results in a more compact design and more energy-efficient operation of the noise field generator 16 and reading device 1.

Based on one advantageous embodiment, a deterministic signal component may additionally be superimposed on the stochastic noise control signal. This deterministic signal component is similar to essential properties of the wanted signal when a magnetic card 3 is being read. However, the deterministic signal component ultimately does not represent valid data. This feature makes it even more difficult to reconstruct the intact signal and determine the wanted signal from the signal of the illegally fitted magnetic field reading head 14. This additional signal component may also be variable, in particular contain random characteristics, which make it yet more difficult to distinguish or separate the signal originating from the magnetic card 3 by signal processing.

The advantageous embodiment illustrated in FIG. 4 is based on the use of at least one other noise field coil 22, which is spaced at a distance apart from the first noise field coil 17 or is oriented differently in terms of its magnetic field or has different magnetic field geometry. This second noise field coil 22 is supplied with a second, likewise stochastic, noise control signal which is linearly independent of the noise signal for the first noise field coil 17. This means that the noise control signals for the different noise field coils 17, 22 are not respectively correlated with one another. To a certain extent, this results in a multi-channel noise field 18, as a result of which the possibility of reconstructing the relevant wanted signal representing the card data from the suppressed signal of an illegally fitted magnetic field reading head 14 is even more significantly reduced, thereby further improving security against tampering.

Based on another advantageous embodiment, the anti-tampering system of the reading device 1 described above and an automated machine equipped with it may also be designed so that the insertion orifice 6 of the reading device 1 is automatically locked if tampering is detected, the noise field generator 16 is not functioning or the signal processing part of the anti-tampering system is inactive.

The term "signals" used above in the context of the digital scanning system, i.e. in connection with the digital signal processor unit 21, should primarily be understood as meaning a sequence of digital scanning values.

Figure 8:
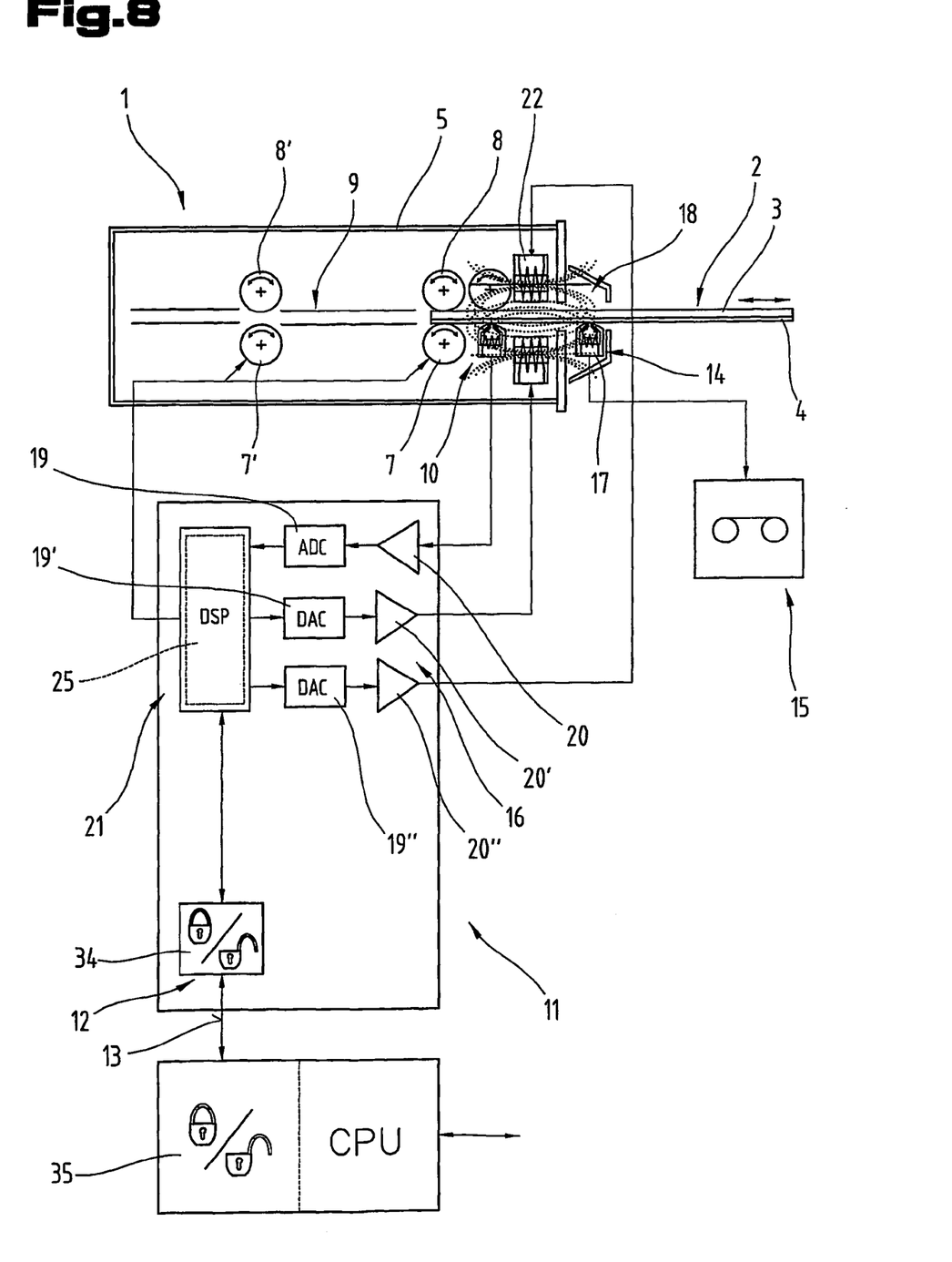
FIG. 8 shows a technical design of the reading device protected against tampering.

FIG. 8 illustrates an advantageous embodiment of the reading device 1 or anti-tampering system, the same reference numbers being used to denote same parts already described above, and the descriptions given above apply literally to those same parts denoted by the same reference numbers. The diagram in FIG. 8 illustrates an embodiment which may be used with the embodiment illustrated in FIG. 4, and it would naturally also be possible for this embodiment to be used with the variant illustrated in FIG. 3.

As a result of this advantageous embodiment, the reconstructed wanted signal is encrypted in the reading device 1 or by means of the evaluation and control device 11. A standard encryption and decryption algorithm 34 is used for encrypting and/or decrypting signals and data. A suitable encryption and decryption method might be DES, TripleDES, RSA or similar, for example.

Encrypted accordingly, the wanted signal, which is based on the magnetically encoded data of an inserted data carrier 2, is then forwarded or transmitted across the data interface 12 or across the at least one status and signal wire 13 to a primary or peripheral electronic unit, for example an automated service machine. In this authorized electronic unit, the received encrypted signal is firstly decrypted by means of an adequate decryption and encryption algorithm 35 so that the wanted signal can then be evaluated and further processed to obtain its data.

It is of practical advantage if the wanted signal from the data carrier 2 is decrypted to obtain its data by means of the signal processor unit 21, which is also programmed to compensate or filter out the effect of the noise field 18 of the noise field coil 17. Similarly, encryption is preferably handled by the computer unit of the peripheral unit, which is usually provided in the form of an industrial PC with co-operating software.

In a similar way, when writing data to the magnetic stripe 4, the encryption may be run in the industrial PC by means of the decryption and encryption algorithm 35 and decryption by means of the encryption and decryption algorithm 34 may be run by the evaluation and control device 11, in particular by the digital signal processor unit 21.

As a result of this advantageous embodiment, even if there have been attempts to tamper with the interior of the reading device 1, it will no longer be possible to obtain usable wanted signals or data from the data carrier 2. If using the features described above, it may not be necessary to encapsulate the reading device 1 with relatively complex and expensive features in order to protect it against unauthorized tampering in many cases. The only other area which is relevant to security and might require protection is on a chip or a small area of a few chips inside the reading device 1. This enables comprehensive security to be obtained against fraudulent manipulation at relatively little cost.

The objective underlying the independent solutions proposed by the invention may be found in the description.

Above all, the individual embodiments illustrated in FIGS. 3, 4, 5, 6, 7, 8 may be construed as independent solutions proposed by the invention in their own right. The objectives and associated solutions may be found in the detailed descriptions of these drawings.

LIST OF REFERENCE NUMBERS

1. Reading device
2. Card-shaped data carrier
3. Magnetic card
4. Magnetic stripe
5. Housing
6. Insertion orifice
7, 7'. Conveyor roller
8, 8'. Counter-pressure roller
9. Guide element
10. Magnetic field reading head (authorized)
11. Evaluation and control circuit
12. Signal and data interface
13. Status and signal wire
14. Magnetic field reading head (unauthorized)
15. Recording apparatus
16. Interference field generator
17. Interference field coil
18. Interference field
19-19". AD/DA convertor
20-20". Amplifier and adaptation stage
21. Digital signal processor unit
22. Interference field coil (second)
23. Pseudo-random number generator
24. Band pass filter
25. Signal-based model
25a, 25a'. Model filter (digital)
26. Summation point
27. Return path
28. Adaptation algorithm
29. Control line
30. Memory
31. Evaluation unit
32. Drive controller
33. Interface
34. Encryption and decryption algorithm
35. Decryption and encryption algorithm

The invention claimed is:

1. Method of securing a reading device for card-shaped data carriers to prevent unauthorized evaluation or copying of magnetically encoded data which is detected in the reading device for card-shaped data carriers, whereby a magnetic noise field is generated via a noise field coil disposed in the immediate vicinity of an insertion orifice for inserting card-shaped data carriers or in the region of a legitimate or authorized magnetic field reading head of the reading device in order to disrupt or affect with this noise field a magnetic field reading head which might have been fitted with a view to interception or with fraudulent intent under certain circumstances whilst the magnetic field of a card-shaped data carrier is being recorded, comprising operating or disposing at least one noise field coil so that the authorized magnetic field reading head is also affected by the noise field of the noise field coil as the magnetically encoded data of a card-shaped data carrier is being read, detecting an output or sum signal of the authorized magnetic field reading head generated from the wanted signal of a card-shaped data carrier and from the effects of the noise field, compensating or filtering out the effect of the noise field of the noise field coil in the output or sum signal of the authorized magnetic field reading head or selectively filtering the wanted signals out of the output or sum signal of the authorized magnetic field reading head, evaluating or further processing the wanted signal inside the reading device or in peripheral electronic units, wherein the output signal of the authorized magnetic field reading head corrected with respect to the effect of the noise field is monitored continuously during those phases when no card-shaped data carrier is being inserted in the reading device to ascertain whether a specific total or spectral power is exceeded and, if such is the case, a corresponding status or error message is made available to a primary device controller.

2. Method as claimed in claim 1, further comprising computerized compensation of the noise effect of the noise field with respect to the output or sum signal of the authorized magnetic field reading head via a signal processor unit, whereby a signal-based model is employed by the signal processor unit amongst other things, via which an effect of a noise control signal or the noise field generated by the noise control signal on the output or sum signal of the authorized magnetic field reading head is reproduced.

3. Method as claimed in claim 1, further comprising positioning the noise field coil and/or dimensioning the field intensity or field characteristic of the noise field coil and/or dimensioning the detection sensitivity of the authorized or legitimate magnetic field reading head so that the noise field of the noise field coil acts on a magnetic field reading head fitted with fraudulent intent, at least when the magnetically encoded data of a card-shaped data carrier is being read and also acts on the legitimate or authorized magnetic field reading head and affects its output or sum signal.

4. Method as claimed in claim 1, further comprising generating the noise field from a stochastic electric noise control signal.

5. Method as claimed in claim 4, further comprising generating the electric noise control signals from a sequence of pseudo-random scanning values using a pseudo-random number generator.

6. Method as claimed in claim 1, further comprising computing the wanted signal out of the output or sum signal of the magnetic field reading head taking account of information about the time sequence of a stochastic noise control signal or noise field.

7. Method as claimed in claim 1, further comprising determining the transmission behavior or a transmission route from an emitted noise control signal to the detected output or sum signal on the authorized magnetic field reading head, and applying the determined transmission behavior in order to compensate the effect of the noise field.

8. Method as claimed in claim 1, further comprising determining the discrete transmission behavior of a transmission route from the sequence of scanning values corresponding to an emitted noise control signal to the sequence of scanning values corresponding to the detected output signal at the authorized magnetic field reading head, and applying the determined transmission behavior in order to compensate the effect of the noise field on a computerized basis.

9. Method as claimed in claim 8, further comprising reproducing the transmission behavior of the transmission route in a digital model filter, the effect of which is described by a set of digital filter coefficients.

10. Method as claimed in claim 1, further comprising generating the noise field whilst the magnetically encoded data of a card-shaped data carrier is being detected by the magnetic field reading head.

11. Method as claimed in claim 9, wherein the digital model filter is adapted to the actual transmission behavior of the real signal transmission route containing at least the noise field coil and the magnetic field reading head of the reading device during ongoing operation, either constantly or at periodic intervals.

12. Method as claimed in claim 2, wherein an additional noise control signal is at least periodically superimposed on the noise control signal which, in terms of essential properties, is similar to a signal that is obtained as a wanted signal when the magnetic stripe of a card-shaped data carrier is read by the magnetic field reading head.

13. Anti-tampering system for use with a reading device for the authorized detection of information magnetically stored on a card-shaped data carrier, which reading device comprises a first respective authorized magnetic field reading head for scanning a card-shaped data carrier and an evaluation and control circuit for evaluating the output signal of the authorized magnetic field reading head and for converting the information contained in the output signal into a digital data set, with a noise field generator which generates a magnetic noise field in order to apply noise to a second respective unauthorized magnetic field reading head which might have been fitted in the immediate vicinity of the reading device with fraudulent intent under certain circumstances,
wherein the noise field generator comprises a signal-based model which is configured to copy the effect of the noise field on the output or sum signal of the authorized magnetic field reading head and this modeled copy is designed to compensate the effect of the noise field on the output or sum signal of the authorized magnetic field reading head and thus reconstruct a wanted signal dependent on an inserted card-shaped data carrier from the output or sum signal of the authorized magnetic field reading head;
wherein the signal-based model is provided in the form of a digital model filter; and
wherein the model filter is adapted during operation, continuously or at regular intervals, and is constantly adapted to a changing transmission behavior of the real route, and at least one set of stored filter parameters is compared at least on a recurring basis with a set of filter parameters of the adapted model filter, and the anti-tampering system is configured to emit a status or error message for a primary device controller in the event of qualified variances.

14. Anti-tampering system as claimed in claim 13, wherein the noise field generator comprises at least one noise field coil positioned in the immediate vicinity of an insertion orifice for a card-shaped data carrier which is supplied with a non-periodic, stochastic, in particular pseudo-random, noise control signal.

15. Anti-tampering system as claimed in claim 13, wherein the spectral power density of a noise control signal of the noise field generator within a predefined frequency band containing a part of the standard frequency range of the wanted signals is significantly higher than outside this predefined frequency band when the card-shaped data carrier is being detected.

16. Anti-tampering system as claimed in claim 13, wherein essential parts needed for processing the signals, in particular the signal-based model for compensating the effect of the noise field, are provided in the form of a discrete scanning system comprising at least one processor, in particular a signal processor unit, an analogue to digital convertor and a digital to analogue convertor.

17. Anti-tampering system as claimed in claim 13, wherein the digital model filter is an FIR filter.

18. Anti-tampering system as claimed in claim 13, wherein the noise field generator comprises a non-volatile memory for storing at least one set of filter parameters of the digital model filter.

19. Anti-tampering system as claimed in claim 18, wherein the at least one set of filter parameters defines the model filter which copies the transmission behavior or transmission characteristic for the noise control signal which is emitted via the noise coil and then detected again by the authorized magnetic field reading head when the reading device is in the non-manipulated, fully functional state.

20. Anti-tampering system as claimed in claim 13, wherein the noise field coil and the magnetic field reading head are combined in a common structural unit.

21. Reading device for the authorized detection of information magnetically stored on a card-shaped data carrier, wherein the reading device has an anti-tampering system as claimed in claim 13.

22. Reading device as claimed in claim 21, wherein the anti-tampering system is designed to automatically lock an insertion orifice for card-shaped data carriers if a malfunction or manipulation is detected by the noise field generator of the reading device.

23. Automated cash dispenser or access control system, wherein the automated cash dispenser or access control system has a reading device as claimed in claim 21.

24. Method as claimed in claim 1, further comprising encryption of the wanted signal or its data in the reading device, by forwarding of the encrypted wanted signal or its data, and by decryption of the wanted signal or its data in an authorized, peripherally disposed electronic unit.

25. Method as claimed in claim 24, further comprising encryption of the wanted signal or its data via a signal processor unit, which is also designed to compensate or filter out the effect of the noise field of the noise field coil.

26. Method of securing a reading device for card-shaped data carriers to prevent unauthorized evaluation or copying of magnetically encoded data which is detected in the reading device for card-shaped data carriers, whereby a magnetic noise field is generated via a noise field coil disposed in the immediate vicinity of an insertion orifice for inserting card-shaped data carriers or in the region of a legitimate or authorized magnetic field reading head of the reading device in order to disrupt or affect with this noise field a magnetic field reading head which might have been fitted with a view to interception or with fraudulent intent under certain circumstances whilst the magnetic field of a card-shaped data carrier is being recorded, comprising operating or disposing at least one noise field coil so that the authorized magnetic field reading head is also affected by the noise field of the noise field coil as the magnetically encoded data of a card-shaped data carrier is being read, detecting an output or sum signal of the authorized magnetic field reading head generated from the wanted signal of a card-shaped data carrier and from the effects of the noise field, compensating or filtering out the effect of the noise field of the noise field coil in the output or sum signal of the authorized magnetic field reading head or selectively filtering the wanted signals out of the output or sum signal of the authorized magnetic field reading head, evaluating or further processing the wanted signal inside the reading device or in peripheral electronic units, reproducing an effect of a noise control signal or the noise field generated by the noise control signal on the output or sum signal of the authorized magnetic field reading head, wherein an additional noise control signal is at least periodically superimposed on the noise control signal which, in terms of essential properties, is similar to a signal that is obtained as a wanted signal when the magnetic stripe of a card-shaped data carrier is read by the magnetic field reading head.

27. Anti-tampering system for use with a reading device for the authorized detection of information magnetically stored on a card-shaped data carrier, which reading device comprises a first respective authorized magnetic field reading head for scanning a card-shaped data carrier and an evaluation and control circuit for evaluating the output signal of the authorized magnetic field reading head and for converting the information contained in the output signal into a digital data set, with a noise field generator which generates a magnetic noise field in order to apply noise to a second respective unauthorized magnetic field reading head which might have been fitted in the immediate vicinity of the reading device with fraudulent intent under certain circumstances, wherein the noise field generator comprises a signal-based model which is configured to copy the effect of the noise field on the output or sum signal of the authorized magnetic field reading head and this modeled copy is designed to compensate the effect of the noise field on the output or sum signal of the authorized magnetic field reading head and thus reconstruct a wanted signal dependent on an inserted card-shaped data carrier from the output or sum signal of the authorized magnetic field reading head, and wherein at least one other noise field coil is provided and the noise field coils are disposed in a different spatial arrangement or different orientation or have a different magnetic field geometry and in particular are mounted in the vicinity of an insertion orifice for the card-shaped data carrier, and are supplied with stochastic noise control signals that are not correlated with one another.

* * * * *